United States Patent
Tanaka et al.

(10) Patent No.: US 9,399,868 B2
(45) Date of Patent: Jul. 26, 2016

(54) COLUMN STRUCTURE AND BASE MEMBER

(71) Applicant: Hitachi Metals Techno, Ltd., Koto-ku, Tokyo (JP)

(72) Inventors: Hidenori Tanaka, Tokyo (JP); Hideaki Takahashi, Tokyo (JP)

(73) Assignee: Senqcia Corporation, Tokyo (JP)

( * ) Notice: Subject to any disclaimer, the term of this patent is extended or adjusted under 35 U.S.C. 154(b) by 0 days.

(21) Appl. No.: 14/345,947

(22) PCT Filed: Mar. 17, 2014

(86) PCT No.: PCT/JP2014/057080
§ 371 (c)(1),
(2) Date: Mar. 20, 2014

(87) PCT Pub. No.: WO2015/140890
PCT Pub. Date: Sep. 24, 2015

(65) Prior Publication Data
US 2015/0259914 A1     Sep. 17, 2015

(51) Int. Cl.
*E02D 27/00* (2006.01)
*E02D 27/32* (2006.01)
(Continued)

(52) U.S. Cl.
CPC .............. *E04C 3/32* (2013.01); *E04B 1/4157* (2013.01); *E02D 27/24* (2013.01); *E02D 27/42* (2013.01);
(Continued)

(58) Field of Classification Search
CPC ... E04B 1/165; E04B 1/41; E04B 2001/2463; E04B 2001/2418; E04B 1/2403; E04B 2001/2415; F24J 2/525; E02D 27/50; E02D 27/24; E04G 23/0218; E04H 9/021; E04H 12/22; E04C 3/30; E04C 3/32

USPC ........ 52/854, 649.2, 699, 705, 712, 849, 837, 52/698, 700, 701, 831, 426, 435, 295, 296, 52/297, 299
See application file for complete search history.

(56) References Cited

U.S. PATENT DOCUMENTS 1,355,536 A  * 10/1920 Caskey ......................... 52/295
1,530,951 A     3/1925 Krauss
(Continued)

FOREIGN PATENT DOCUMENTS

CN         1873112 A     12/2006
CN       203188470 U      9/2013
(Continued)

OTHER PUBLICATIONS

Partial English language translation of the following: Office action dated May 19, 2015 from Japanese Patent Office in a Japanese patent application corresponding to the instant patent application.
(Continued)

*Primary Examiner* — Chi Q Nguyen
(74) *Attorney, Agent, or Firm* — Solaris Intellectual Property Group, PLLC

(57) ABSTRACT

In a column structure, a steel column having a web and flanges integrally provided to both sides in a width direction of the web is welded to a base plate. First anchor bolts and second anchor bolts are anchored in foundation concrete. The base plate is fixed to the first anchor bolts at an opposite side to the web with respect to the flanges, and fixed to the second anchor bolts at a web side with respect to the flanges. The load bearing ability of a column setup can therefore be efficiently exhibited, and a thickness dimension of the base plate can be reduced.

11 Claims, 9 Drawing Sheets

(51) Int. Cl.
  E04C 3/32 (2006.01)
  E04B 1/41 (2006.01)
  E04H 12/22 (2006.01)
  E04B 1/24 (2006.01)
  E02D 27/24 (2006.01)
  E04H 9/02 (2006.01)
  E04G 23/02 (2006.01)
  E02D 27/42 (2006.01)
  E02D 27/50 (2006.01)
  E04C 3/30 (2006.01)
  F24J 2/52 (2006.01)

(52) U.S. Cl.
  CPC ............... *E02D 27/50* (2013.01); *E04B 1/2403* (2013.01); *E04B 1/41* (2013.01); *E04B 2001/2415* (2013.01); *E04B 2001/2418* (2013.01); *E04B 2001/2463* (2013.01); *E04C 3/30* (2013.01); *E04G 23/0218* (2013.01); *E04H 9/021* (2013.01); *E04H 12/22* (2013.01); *F24J 2/525* (2013.01)

(56) References Cited

U.S. PATENT DOCUMENTS

| | | | |
|---|---|---|---|
| 2,610,708 A | | 9/1952 | Shannon |
| 2,943,716 A | * | 7/1960 | Babcock ................ 52/653.1 |
| 3,918,229 A | * | 11/1975 | Schweinberger ....... E02D 27/14 52/295 |
| 4,048,776 A | | 9/1977 | Sato |
| 4,571,913 A | * | 2/1986 | Schleich et al. .......... 52/649.2 |
| 4,878,160 A | * | 10/1989 | Reneau et al. .............. 362/269 |
| 4,965,974 A | | 10/1990 | LeBow |
| 5,054,251 A | | 10/1991 | Kemeny |
| 5,063,719 A | | 11/1991 | Matsuo et al. |
| 5,274,971 A | * | 1/1994 | Elmore et al. ................ 52/144 |
| 5,307,603 A | * | 5/1994 | Chiodo ........................ 52/698 |
| 5,410,847 A | | 5/1995 | Okawa et al. |
| 5,412,913 A | * | 5/1995 | Daniels et al. ............ 52/79.13 |
| 5,426,267 A | | 6/1995 | Underhill et al. |
| 5,444,951 A | * | 8/1995 | Scott et al. ................. 52/169.9 |
| 5,467,567 A | * | 11/1995 | Christensen ................. 52/459 |
| 5,505,033 A | | 4/1996 | Matsuo et al. |
| 5,540,027 A | * | 7/1996 | Christensen et al. .......... 52/459 |
| 5,678,382 A | | 10/1997 | Naito |
| 6,219,989 B1 | | 4/2001 | Tumura |
| 6,367,762 B1 | | 4/2002 | Koban |
| 6,438,904 B1 | * | 8/2002 | Anzai et al. ................. 52/167.1 |
| 6,754,999 B1 | | 6/2004 | Urbanczyk |
| 6,931,804 B2 | | 8/2005 | Trarup et al. |
| 7,647,742 B2 | * | 1/2010 | Han .............................. 52/741.1 |
| 8,011,156 B1 | * | 9/2011 | Schwan ....................... 52/653.1 |
| 8,037,651 B2 | | 10/2011 | Dent |
| 8,336,267 B2 | | 12/2012 | Montague |
| 8,850,765 B2 | | 10/2014 | Amengual Pericas |
| 8,955,283 B2 | | 2/2015 | Takagi et al. |
| 2002/0002806 A1 | | 1/2002 | Commins et al. |
| 2002/0066245 A1 | | 6/2002 | Pryor |
| 2002/0095275 A1 | * | 7/2002 | Anzai et al. ...................... 703/1 |
| 2003/0009964 A1 | | 1/2003 | Trarup et al. |
| 2003/0196393 A1 | | 10/2003 | Bowman et al. |
| 2004/0040224 A1 | * | 3/2004 | Dayton ........................... 52/93.1 |
| 2004/0148903 A1 | | 8/2004 | Cash |
| 2005/0120666 A1 | | 6/2005 | Alyea et al. |
| 2006/0048471 A1 | | 3/2006 | Lee |
| 2007/0209314 A1 | | 9/2007 | Vaughn |
| 2007/0245674 A1 | | 10/2007 | Hubbell |
| 2009/0272053 A1 | | 11/2009 | Dent |
| 2009/0279959 A1 | | 11/2009 | Bakos |
| 2010/0146890 A1 | | 6/2010 | Kristensen |
| 2011/0154758 A1 | | 6/2011 | Reyneveld |
| 2012/0186168 A1 | | 7/2012 | McPhee |
| 2014/0069046 A1 | | 3/2014 | Cai |
| 2014/0230365 A1 | | 8/2014 | Hemphill |
| 2014/0318033 A1 | | 10/2014 | Coordes |

FOREIGN PATENT DOCUMENTS

| | | |
|---|---|---|
| CN | 203452266 U | 2/2014 |
| CN | 203531147 U | 4/2014 |
| JP | H02-213540 A | 8/1990 |
| JP | H04-052320 A | 2/1992 |
| JP | H04-153427 | 5/1992 |
| JP | H05-214731 A | 8/1993 |
| JP | H06-010408 A | 1/1994 |
| JP | H06-010410 A | 1/1994 |
| JP | H06-019147 A | 1/1994 |
| JP | 2655774 B2 | 9/1997 |
| JP | H09-264029 A | 10/1997 |
| JP | H10-008555 A | 1/1998 |
| JP | 2001-288815 A | 10/2001 |
| JP | 2002-146923 | 5/2002 |
| JP | 2002-322737 A | 11/2002 |
| JP | 2002-339455 A | 11/2002 |
| JP | 2002-364070 A | 12/2002 |
| JP | 2003-232078 | 8/2003 |
| JP | 2003-239381 A | 8/2003 |
| JP | 2004-176482 A | 6/2004 |
| JP | 2005-16212 A | 1/2005 |
| JP | 2006-125157 A | 5/2006 |
| JP | 2008-144425 A | 6/2008 |
| JP | 2008-280787 A | 11/2008 |
| JP | 2009-024367 A | 2/2009 |
| JP | 2009-062717 A | 3/2009 |
| JP | 2009-256885 A | 11/2009 |
| JP | 2009-275390 A | 11/2009 |
| JP | 4570139 B2 | 10/2010 |
| JP | 2011-012402 A | 1/2011 |
| JP | 2011-247077 | 12/2011 |
| JP | 2012-7381 A | 1/2012 |
| JP | 2012-007382 A | 1/2012 |
| JP | 2013-64244 | 4/2013 |
| JP | 2013-100673 A | 5/2013 |
| JP | H05-346038 B2 | 11/2013 |
| TW | 174024 | 12/1991 |
| TW | 541388 B | 7/2003 |

OTHER PUBLICATIONS

Japanese Office Action dated May 19, 2015 in Japanese Patent Application No. 2014-513828.
U.S Office Action dated Feb. 24, 2015, issued against U.S. Appl. No. 14/345,946.
U.S Office Action dated Oct. 31, 2014, issued against U.S. Appl. No. 14/345,948.
U.S Office Action dated Apr. 17, 2015, issued against U.S. Appl. No. 14/345,948.
U.S Office Action dated May 21, 2015, issued against U.S. Appl. No. 14/345,949.
U.S Office Action dated Aug. 21, 2015, issued against U.S. Appl. No. 14/345,946.
U.S. Office Action dated Oct. 21, 2015, issued for U.S. Appl. No. 14/345,951.
U.S. Office Action dated Dec. 21, 2015, issued for U.S. Appl. No. 14/345,949.
English Translation of the Taiwanese Office Action dated Aug. 26, 2015 in the corresponding Taiwanese Patent Application No. 103109927.

* cited by examiner

COLUMN STRUCTURE AND BASE MEMBER

TECHNICAL FIELD

The present invention relates to a column structure with a column member joined to the upper side of a base member, and to a base member that has an upper side for joining to a column member.

BACKGROUND ART

In Japanese Patent Application Laid-Open (JP-A) No. 2013-100673, a support column is fixed to the upper side of a base plate, and a column member is configured from H-shaped steel that is integrally provided with flanges on both sides in a width direction of a web.

In the above document, the base plate is only fastened to an upper plate at a web side and an opposite to the web side with respect the flange.

DISCLOSURE OF INVENTION

Technical Subject

In consideration of the above circumstances, a subject of the present invention is to obtain a column structure capable of efficiently exhibiting load bearing ability in a column setup and capable of reducing a thickness dimension of a base member, and to obtain a base member capable of efficiently exhibiting load bearing ability in a column setup and capable of reducing a thickness dimension of a base body.

Solution to Problem

A column structure of a first aspect of the present invention includes: a column member having a web and flanges that are integrally provided with at both sides, in a width direction, of the web; a base member that has an upper side that is joined to the column member; a first anchor member including a lower end side and an upper end side, a first anchor portion is attached to the lower end side and the lower end side is anchored in concrete, and the base member is fixed to the upper end side at an opposite side to the web with respect to the flange; and a second anchor member including a lower end side and an upper end side, a second anchor portion is attached to the lower end side and the lower end side is anchored in concrete, and the base member is fixed to the upper end side at a web side with respect to the flange.

A column structure of a second aspect of the present invention is the column structure of the first aspect of the present invention, wherein the base member is fixed to the upper end side of at least one of the first anchor member or the second anchor member at outside in a width direction of the flange.

A column structure of a third aspect of the present invention is the column structure of either the first aspect or the second aspect of the present invention, wherein an indented portion is provided in a lower side face of the base member.

A column structure of a fourth aspect of the present invention is the column structure of any one of the first aspect to the third aspect of the present invention, wherein the base member includes: base portions that are provided at flange sides; a connection portion that connects together a pair of the base portion; and a cutaway portion that is provided between the pair of the base portion.

A column structure of a fifth aspect of the present invention is the column structure of any one of the first aspect to the third aspect of the present invention, wherein the base member is provided at each of flange sides, and a gap is provided between the base members.

A column structure of a sixth aspect of the present invention is the column structure of the fifth aspect of the present invention, wherein a projection portion is provided to the base member and projects out to a web side with respect to the flange below the web.

A base member of a seventh aspect of the present invention includes: a base body that has an upper side for joining to a column member having a web and flanges that are integrally provided at both sides in a width direction of the web; a first fixing portion provided at the base body at an opposite side to the web with respect to the flange, and the first fixing portion is fixed to an upper end side of a first anchor member, the first anchor member includes a lower end side to which a first anchor portion is attached and the lower end side is anchored in concrete; and a second fixing portion provided at the base body at a web side with respect to the flange, the second fixing portion is fixed to an upper end side of a second anchor member, the second anchor member includes a lower end side to which a second anchor portion is attached and the lower end side is anchored in the concrete.

A base member of an eighth aspect of the present invention is the base member of the seventh aspect of the present invention, wherein at least one of the first fixing portion or the second fixing portion is disposed at outside in a width direction of the flange.

A base member of a ninth aspect of the present invention is the base member of either the seventh aspect or the eighth aspect of the present invention, wherein an indented portion is provided in a lower side face of the base body.

A base member of a tenth aspect of the present invention is the base member of any one of the seventh aspect to the ninth aspect of the present invention, wherein the base body includes: base portions that are provided at flange sides; a connection portion that connects together a pair of the base portion; and a cutaway portion that is provided between the pair of the base portion.

A base member of a eleventh aspect of the present invention is the base member of any one of the seventh aspect to the ninth aspect of the present invention, wherein the base body is provided at each of the flange sides, and a gap is provided between the base bodies.

A base member of a twelfth aspect of the present invention is the base member of the eleventh aspect of the present invention, wherein a projection portion is provided to the base body and projects out to a web side with respect to the flange below the web.

Advantageous Effects of Invention

In the column structure of the first aspect of the present invention, the column member has the web and the flanges that are integrally provided at both sides in a width direction of the web is joined to the upper side of the base member.

The first anchor member and the second anchor member have the first anchor portion and the second anchor portion attached to their respective lower end sides, and the lower end sides of the first anchor member and the second anchor member are anchored in concrete. The base member is fixed to the upper end sides of the first anchor member and the second anchor member, respectively at the web side and the opposite side to the web with respect to the flange. Load bearing ability (load bearing ability with respect to bending moment) of a column setup, that configures a bending moment transmission section from the column member to the concrete and that includes the base member, the first anchor member and the second anchor member, can be efficiently exhibited, and a thickness dimension of the base member can be reduced.

In the column structure of the second aspect of the present invention, the base member is fixed to the upper end side of at least one of the first anchor member or the second anchor member at outside in the width direction of the flange. The load bearing ability of the column setup can accordingly be even more efficiently exhibited.

In the column structure of the third aspect of the present invention, the indented portion is provided in the lower side face of the base member. Displacement of the base member in the horizontal direction can accordingly be suppressed.

In the column structure of the fourth aspect of the present invention, the base member is provided with the base portions at the flange sides, and the connection portion connects together the pair of the base portions.

The cutaway portion is provided between the pair of the base portions. The weight of the base member can accordingly be reduced. Moreover, the load bearing ability of the column setup can be efficiently exhibited as before since the web is disposed between the pair of the base portions.

In the column structure of the fifth aspect of the present invention, the base member is provided at each of flange sides, and the gap is provided between a pair of the base members. This thereby enables the respective base members to be made smaller, enabling the total weight of the pair of the base members to be reduced. Moreover, the load bearing ability of the column setup can be efficiently exhibited as before since the web is disposed between the pair of the base members.

In the column structure of the sixth aspect of the present invention, the projection portion is provided to the base member and projects out to the web side with respect to the flange below the web. This thereby enables the projection portion to be joined to the web, enabling the column member to be joined strongly to the base member.

In the base member of the seventh aspect of the present invention, the column member has the web and flanges that are integrally provided at both sides in the width direction of the web is joined to the upper side of the base body.

The first anchor member and the second anchor member have the first anchor portion and the second anchor portion respectively attached to their lower end sides, and the lower end sides of the first anchor member and the second anchor member are anchored in concrete. The base body is moreover fixed at the first fixing portion and at the second fixing portion to the respective upper ends sides of the first anchor member and the second anchor member. The first fixing portion locates at the opposite side to the web with respect to the flange and the second fixing portion locates on the web side with respect to the flange. Load bearing ability (load bearing ability with respect to bending moment) of a column setup, that configure a bending moment transmission section from the column member to the concrete and that includes the base member, the first anchor member and the second anchor member, can be efficiently exhibited, and a thickness dimension of the base body can be reduced.

In the base member of the eighth aspect of the present invention, at least one of the first fixing portion or the second fixing portion is disposed at outside in the width direction of the flange. The load bearing ability of the column setup can accordingly be even more efficiently exhibited.

In the base member of the ninth aspect of the present invention, the indented portion is provided in the lower side face of the base body. Displacement of the base body in the horizontal direction can accordingly be suppressed.

In the base member of the tenth aspect of the present invention, the base body is provided with the base portions at the flange sides, and the connection portion connects together the pair of the base portions.

The cutaway portion is provided between the pair of the base portions. The weight of the base body can accordingly be reduced. Moreover, the load bearing ability of the column setup can be efficiently exhibited as before since the web is disposed between the pair of the base portions.

In the base member of the eleventh aspect of the present invention, the base body is provided at each of the flange sides, and the gap is provided between the pair of the base bodies. This thereby enables the respective base bodies to be made smaller, enabling the total weight of the pair of the base bodies to be reduced. Moreover, the load bearing ability of the column setup can be efficiently exhibited as before since the web is disposed between the pair of the base bodies.

In the base member of the twelfth aspect of the present invention, the projection portion is provided to the base body and projects out to the web side with respect to the flange below the web. This thereby enables the projection portion to be joined to the web, enabling the column member to be joined strongly to the base body.

BEST MODE FOR CARRYING OUT THE INVENTION

First Exemplary Embodiment

Figure 1:
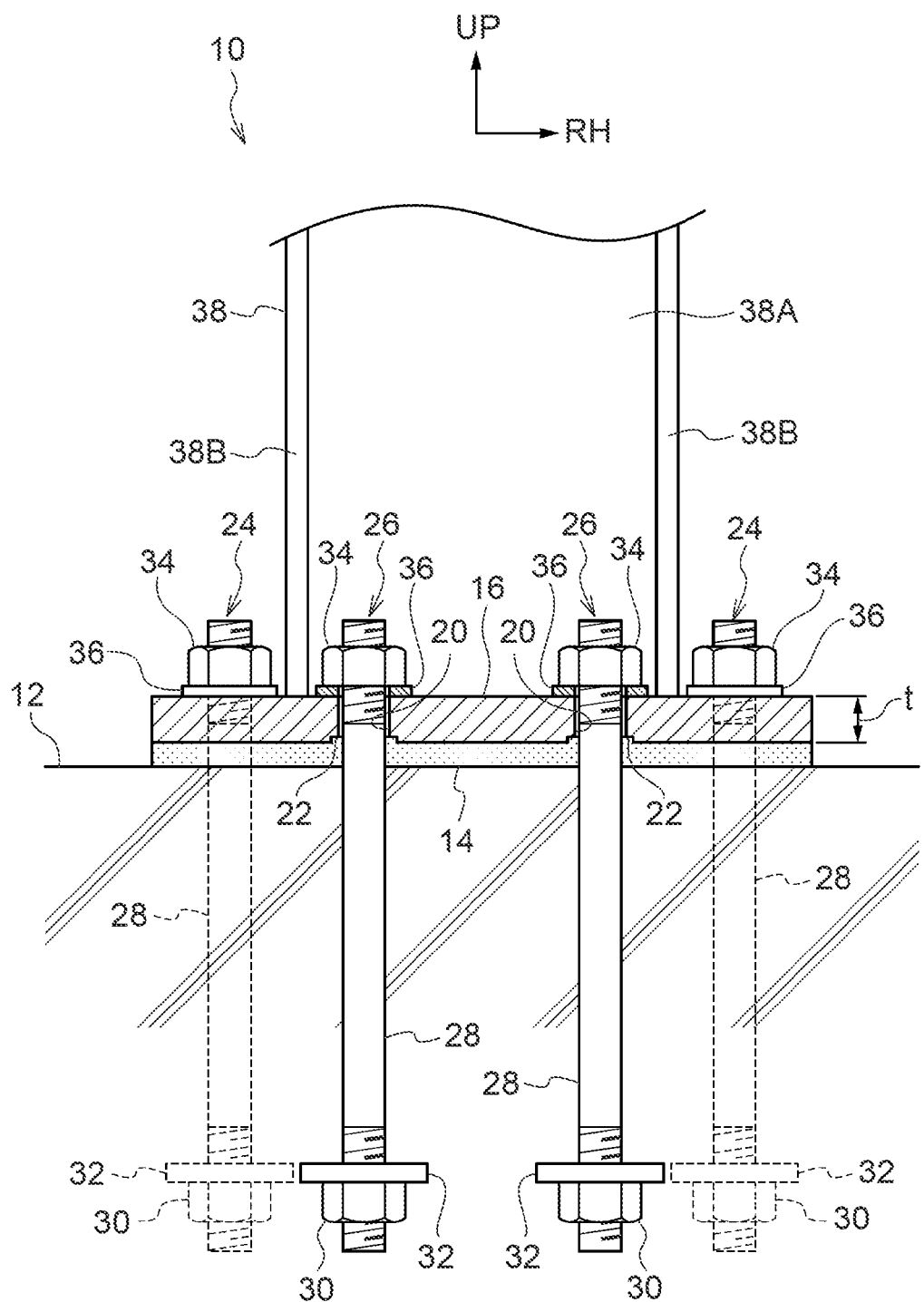
FIG. 1 is a cross-section view of a column structure according to a first exemplary embodiment of the present invention, as viewed from front side.
Figure 2:
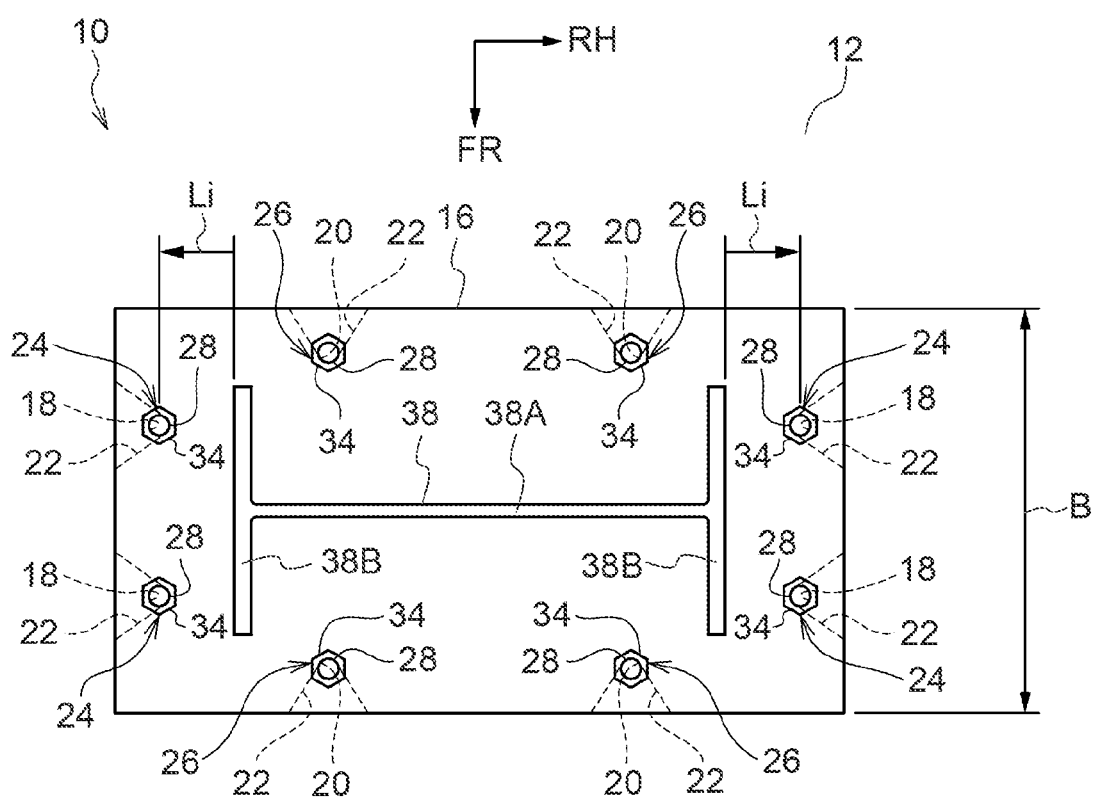
FIG. 2 is a plan view of a column structure according to the first exemplary embodiment of the present invention.

FIG. 1 illustrates a cross-section of a column structure 10 according to the first exemplary embodiment of the present invention, as viewed from front side; FIG. 2 illustrates a plan view of the column structure 10. Note that in the drawings the arrow FR indicates forward, the arrow RH indicates the right hand side, and the arrow UP indicates upward.

As illustrated in FIG. 1 and FIG. 2, the column structure 10 according to the present exemplary embodiment is set in foundation concrete 12 serving as concrete so as to be disposed in an up-down direction perpendicular to the upper face of the foundation concrete 12 which is formed in a flat plane shape.

Mortar 14 serving as a fixing member is fixed to the upper face of the foundation concrete 12, and the mortar 14 is provided in a rectangular shape in plan view.

A metal base plate 16 serving as a base member and as a base body is fixed to the upper face of the mortar 14. The mortar 14 is disposed across the entire lower side of the base plate 16. The base plate 16 is formed in a rectangular plate shape, and the base plate 16 is disposed such that the length direction and width direction thereof are respectively parallel to the left-right direction and the front-rear direction, with the left-right direction dimension greater than the front-rear direction dimension.

A pair of circular shaped first fixing holes 18 that each serve as a first fixing portion is respectively formed at both a left hand side portion and a right hand side portion of the base plate 16, penetrating through central portions in a front-rear direction of the base plate 16, with the axial direction of the first fixing holes 18 parallel to the up-down direction. Positions in the left-right direction of the pair of first fixing holes 18 (the center axial lines thereof) on the left hand side, and positions in the left-right direction of the pair of first fixing holes 18 (the center axial lines thereof) on the right hand side are respectively aligned with each other; the pair of first fixing holes 18 (the center axial lines thereof) on the left hand side, and the pair of first fixing holes 18 (the center axial lines thereof) on the right hand side are disposed symmetrically to each other about a plane that is perpendicular to the left-right direction and passes through in the up-down direction at a central location in the left-right direction of the base plate 16. The front-rear direction positions of the pair of first fixing holes 18 (the center axial lines thereof) at the front side, and the front-rear direction positions of the pair of first fixing holes 18 (the center axial lines thereof) at the rear side are respectively aligned with each other; the pair of first fixing holes 18 (the center axial lines thereof) at the front side, and the pair of first fixing holes 18 (the center axial lines thereof) at the rear side are disposed symmetrically to each other about a plane that is perpendicular to the front-rear direction and passes through in the up-down direction at a central location in the front-rear direction of the base plate 16.

A pair of circular shaped second fixing holes 20 that each serve as a second fixing portion is respectively formed at both the left hand side portion and the right hand side portion of the base plate 16, penetrating through front-rear direction outside portions of the base plate 16, with the axial direction of the second fixing holes 20 parallel to the up-down direction. Positions in the left-right direction of the pair of second fixing holes 20 (the center axial lines thereof) on the left hand side, and positions in the left-right direction of the pair of second fixing holes 20 (the center axial lines thereof) on the right hand side are respectively aligned with each other; the pair of second fixing holes 20 (the center axial lines thereof) on the left hand side and the pair of second fixing holes 20 (the center axial lines thereof) on the right hand side are disposed symmetrically to each other about a plane that is perpendicular to the left-right direction and passes through in the perpendicular direction at a central location in the left-right direction of the base plate 16. The front-rear direction positions of the pair of second fixing holes 20 (the center axial lines thereof) at the front side, and the front-rear direction positions of the pair of second fixing holes 20 (the center axial lines thereof) at the rear side are respectively aligned with each other; the pair of second fixing holes 20 (the center axial lines thereof) at the front side, and the pair of second fixing holes 20 (the center axial lines thereof) at the rear side are disposed symmetrically to each other about a plane that is perpendicular to the front-rear direction and passes through in the perpendicular direction at a central location in the front-rear direction of the base plate 16. The pair of second fixing holes 20 (the center axial lines thereof) on the left hand side are disposed at the right hand side (to center side in the base plate 16 left-right direction) from the pair of first fixing holes 18 (the center axial lines thereof) on the left hand side; the pair of second fixing holes 20 (the center axial lines thereof) on the right hand side are disposed at the left hand side (to center side in the base plate 16 left-right direction) from the pair of first fixing holes 18 (the center axial lines thereof) on the right hand side.

Indented portions 22 are formed at the lower face of the base plate 16 at the periphery of the first fixing holes 18 and the second fixing holes 20; the upper face (bottom face) of each of the indented portions 22 is a flat plane shape disposed perpendicular to the up-down direction. The indented portions 22 are formed in substantially triangular shapes in plan view, with a width dimension that gradually increases on progression toward the outer peripheral side of the base plate 16, with the indented portion 22 open to the outside of the outer periphery of the base plate 16. The peripheral face of each of the indented portions 22 is disposed perpendicular to the horizontal direction, and the peripheral face, that is formed at center side of the base plate 16, of each of the indented portion 22 is in the same plane as a peripheral face of the respective first fixing hole 18 or second fixing hole 20. The mortar 14 fills the whole of the indented portions 22 such that the base plate 16 is anchored in the horizontal direction to the mortar 14 by the peripheral faces of the indented portions 22.

Two pairs each of first anchor bolts 24 serving as first anchor members and second anchor bolts 26 serving as second anchor members are respectively fixed to the foundation concrete 12; the first anchor bolts 24 and the second anchor bolts 26 are configured similarly to each other.

Circular rod shaped anchor bodies 28 are respectively provided to the first anchor bolts 24 and the second anchor bolts 26, with the anchor bodies 28 disposed with their axial directions parallel to the up-down direction, and with portions of the anchor bodies 28 other than an upper end portion buried in the foundation concrete 12, with the upper end portion penetrating the mortar 14.

An anchor nut 30 that has a multifaceted tube shaped external profile and configures a first anchor portion or a second anchor portion is threaded coaxially on to a lower end portion of each of the anchor bodies 28; directly above the anchor nut 30, the lower end portion of each of the anchor bodies 28 passes coaxially through a circular ring plate shaped fixing plate 32 that configures the first anchor portion or the second anchor portion. The anchor nut 30 and the fixing plate 32 are thereby attached to the lower end portion outer periphery of each of the anchor bodies 28. The anchor nut 30 and the fixing plate 32 protrude out to the radial direction outside of each of the anchor bodies 28 and are buried in the foundation concrete 12. The first anchor bolts 24 and the second anchor bolts 26 are thereby anchored in the up-down direction to the foundation concrete 12 by the anchor nut 30 and the fixing plate 32.

The upper end portion of the each of the anchor bodies 28 in the first anchor bolts 24 passes through the base plate 16 coaxially to the respective first fixing hole 18. The upper end portion of each of the anchor bodies 28 of the second anchor bolts 26 passes through the base plate 16 coaxially to the respective second fixing hole 20. A fixing nut 34 that has a multifaceted tube shaped external profile is threaded coaxially onto an upper end portion of each of the respective anchor bodies 28. Directly below the fixing nut 34, the upper end portion of each of the anchor bodies 28 passes coaxially through a circular flat plate shaped washer 36. The fixing nut 34 and the washer 36 are thereby attached to the outer periphery of the upper end portion of each of the anchor bodies 28. Each of the washers 36 and the base plates 16 is clamped between the fixing nut 34 and the mortar 14, and the base plate 16 is fixed to the first anchor bolts 24 at the first fixing holes 18, and is fixed to the second anchor bolts 26 at the second fixing holes 20.

The lower end of a steel column 38 serving as a column member is welded (joined) to a central portion of the upper face of the base plate 16, with the length direction of the steel column 38 disposed parallel to the up-down direction.

An elongated rectangular shaped web 38A is provided at the steel column 38. The web 38A is disposed at center in the front-rear direction of the base plate 16 with its width direction disposed parallel to the left-right direction, with the center in the width direction of the web 38A aligned with the center in the left-right direction of the base plate 16. Elongated rectangular shaped flanges 38B are respectively integrally provided at the both sides in the width direction of the web 38A. The flanges 38B are disposed at the left hand side portion and the right hand side portion of the base plate 16, with their width directions parallel to the front-rear direction. The center in the width direction of each of the flanges 38B is connected to the web 38A, and the flanges 38B extend out forward and rearward of the web 38A. The steel column 38 is thereby configured with an H-shaped cross-section as viewed along the up-down direction.

At the left hand side portion and the right hand side portion of the base plate 16, the axial lines of the first fixing holes 18 and the first anchor bolts 24 are disposed on the opposite side to the web 38A with respect to the flanges 38B and at inside in the width direction of the flanges 38B. The axial lines of the second fixing holes 20 and the second anchor bolts 26 are disposed on the web 38A side with respect to the flanges 38B and at outside in the width direction of the flanges 38B.

There are plural of the column structures 10 provided for a building, and footing beams (not illustrated in the drawings) span across between lower end portions of the steel columns 38 of adjacent column structures 10, so as to arrange the major footing beam layout.

Explanation next follows regarding the operation of the present exemplary embodiment.

In the column structure 10 configured as above, the steel column 38 is welded to the upper face of the base plate 16, and in the steel column 38 the flanges 38B are integrally provided at the both sides in the width direction (left-right direction) of the web 38A. The base plate 16 is fixed to the first anchor bolts 24 at the first fixing holes 18, and fixed to the second anchor bolts 26 at the second fixing holes 20.

However, generally the greater the total number of the first anchor bolts 24 and the second anchor bolts 26 (equivalent to the total number of the first fixing holes 18 and the second fixing holes 20), the greater the thickness dimension (up-down direction dimension) of the base plate 16 is necessary.

Moreover, at the left hand side portion or the right hand side portion of the base plate 16, the total number of the first anchor bolts 24 and the second anchor bolts 26 (equivalent to the total number of the first fixing hole 18 and the second fixing holes 20) with center axial lines thereof disposed on the opposite side to the web 38A with respect to the flanges 38B is denoted n (2 in the present exemplary embodiment), the yield tensile strength in the axial direction of the $i^{th}$ first anchor bolt 24 or second anchor bolt 26 (the $i^{th}$ anchor body 28) is denoted Ti, and the separation distance from the flanges 38B toward outside in the web 38A width direction of the center axial line of the $i^{th}$ first anchor bolt 24 or second anchor bolt 26 ($i^{th}$ anchor body 28), equivalent to the center axial line of the $i^{th}$ first fixing hole 18 or the second fixing hole 20, is denoted Li. Furthermore, the dimension (width dimension) in the front-rear direction of the base plate 16 is denoted B, the thickness dimension of the base plate 16 is denoted t, and the yield point of material of the base plate 16 is denoted σ

In this case the base plate 16 generally needs to satisfy the following Expression (1).

$$\sum_{i=1}^{n} TiLi \leq B(t^2/6)\sigma \quad \text{Expression (1)}$$

The first anchor bolts 24 and the second anchor bolts 26 are each anchored to the foundation concrete 12 in the up-down direction by the anchor nut 30 and the fixing plate 32. Moreover, in the left hand side portion and the right hand side portion of the base plate 16, the first anchor bolts 24 (the first fixing holes 18) are disposed on the opposite side to the web 38A with respect to the flanges 38B, and the second anchor bolts 26 (second fixing holes 20) are disposed on the web 38A side with respect to the flanges 38B.

Thus even when a rotation moment about the lower end of the steel column 38 acts in the web 38A width direction (left-right direction) on the steel column 38, such as during an earthquake, bending deformation at outside in the web 38A width direction of the base plate 16 can be suppressed by the first anchor bolts 24 and the second anchor bolts 26, and the load bearing ability (load bearing ability with respect to the bending moment) of the column setup including the base plate 16, the mortar 14, the first anchor bolts 24 and the second anchor bolts 26 can be efficiently exhibited. The column setup configures a bending moment transmission section from the steel column 38 to the foundation concrete 12.

Moreover, only the center axial lines of the first anchor bolts 24 (the first fixing holes 18), and not the center axial lines of the second anchor bolts 26 (the second fixing holes 20), are disposed on the opposite side to the web 38A with respect to the flanges 38B, enabling a value at the left hand side of Equation (1) to be reduced, and this accordingly enables a value at the right hand side of Equation (1) to be reduced. The thickness dimension t of the base plate 16 can thereby be reduced.

Moreover, the first anchor bolts 24 (the first fixing holes 18) are disposed inside in the width direction of the flanges 38B, and the second anchor bolts 26 (the second fixing holes 20) are disposed outside in the width direction of the flanges 38B. Thus even when a rotation moment about the lower end of the steel column 38 acts in the flanges 38B width direction (front-rear direction) on the steel column 38, such as during an earthquake, bending deformation at outside in the flanges 38B width direction of the base plate 16 can be suppressed by the first anchor bolts 24 and the second anchor bolts 26, enabling the load bearing ability of the column setup to be even more efficiently exhibited.

Moreover, the base plate 16 is anchored to the mortar 14 in the horizontal direction by the peripheral faces of the indented portions 22. Thus even when load acts on the base plate 16 in the horizontal direction, such as during an earthquake, displacement of the base plate 16 in the horizontal direction can be suppressed. This thereby enables the shear resistance of the steel column 38, the first anchor bolts 24, and the second anchor bolts 26 to be raised.

Moreover, the separation distance can be increased in the front-rear direction and the left-right direction between adjacent first anchor bolts 24 and second anchor bolts 26. This thereby enables easy layout of major footing beams between the lower end portions of the steel column 38 in adjacent column structures 10 in a building, raising efficiency of construction work.

Second Exemplary Embodiment

Figure 3:
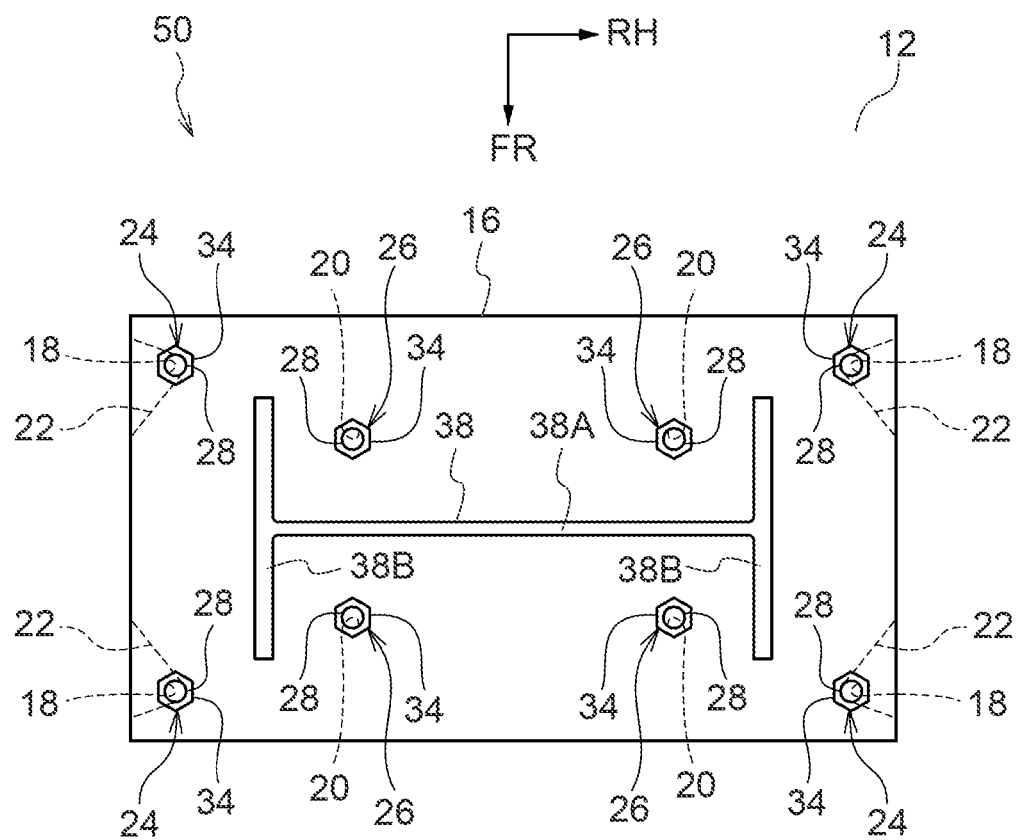
FIG. 3 is a plan view of a column structure according to a second exemplary embodiment of the present invention.

FIG. 3 is a plan view illustrating a column structure 50 according to a second exemplary embodiment of the present invention.

The column structure 50 according to the present exemplary embodiment is configured substantially the same as the first exemplary embodiment, but differs in the following points.

As illustrated in FIG. 3, in the column structure 50 according to the present exemplary embodiment, at the left hand side portion and the right hand side portion of the base plate 16, the center axial lines of the first fixing holes 18 and the first anchor bolts 24 are disposed at outside in the width direction of the flanges 38B, and the center axial lines of the second fixing holes 20 and the second anchor bolts 26 are disposed at inside in the width direction of the flanges 38B.

The lower face of the base plate 16 is not formed with the indented portions 22 at the periphery of each of the second fixing holes 20.

The present exemplary embodiment is capable of exhibiting similar operation and advantageous effects to those of the first exemplary embodiment.

In particular, the first anchor bolts 24 (the first fixing holes 18) are disposed at outside in the width direction of the flanges 38B, and the second anchor bolts 26 (second fixing holes 20) are disposed at inside in the width direction of the flanges 38B. Thus, even when a rotation moment about the lower end of the steel column 38 acts in the flanges 38B width direction (front-rear direction) on the steel column 38, such as during an earthquake, bending deformation at outside in the flanges 38B width direction of the base plate 16 can be suppressed by the first anchor bolts 24 and the second anchor bolts 26, enabling the load bearing ability of the column setup to be exhibited even more efficiently.

Third Exemplary Embodiment

Figure 4:
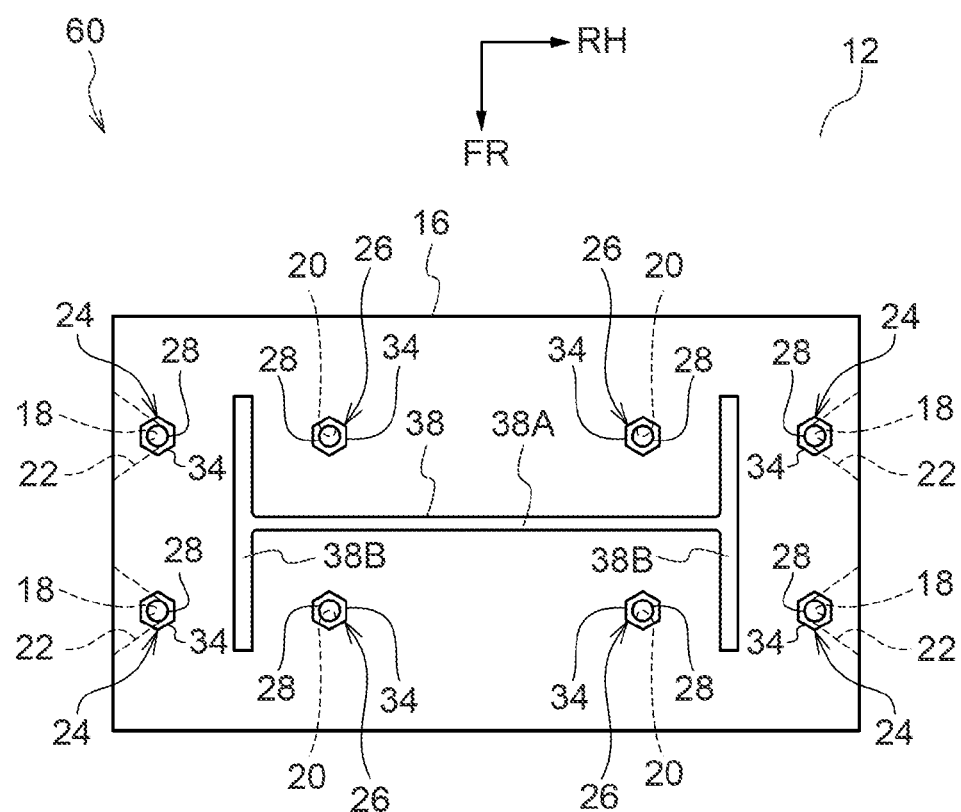
FIG. 4 is a plan view of a column structure according to a third exemplary embodiment of the present invention.

FIG. 4 illustrates a plan view of a column structure 60 according to a third exemplary embodiment of the present invention The column structure 60 according to the present exemplary embodiment is configured substantially the same as the first exemplary embodiment, but differs in the following points.

As illustrated in FIG. 4, in the column structure 60 of the present exemplary embodiment, at the left hand side portion and the right hand side portion of the base plate 16, the center axial lines of the second fixing holes 20 and the second anchor bolts 26 are disposed at inside in the width direction of the flanges 38B, and at a front side portion and a rear side portion of the base plate 16, positions in the front-rear direction of the center axial lines of the first fixing holes 18 and the first anchor bolts 24 are aligned with the center axial lines of the second fixing holes 20 and the second anchor bolts 26.

The lower face of the base plate 16 is not formed with the indented portions 22 at the periphery of each of the second fixing holes 20.

The present exemplary embodiment is capable of exhibiting similar operation and advantageous effects to the first exemplary embodiment, with the exception of operation and advantageous effects resulting from disposing the second anchor bolts 26 (the second fixing holes 20) at outside in the width direction of the flanges 38B and operation and advantageous effects resulting from increasing the separation distance in the front-rear direction and the left-right direction between adjacent first anchor bolts 24 and second anchor bolts 26.

Note that in the present exemplary embodiment, the center axial lines of the first fixing holes 18 and the first anchor bolts 24 and the center axial lines of the second fixing holes 20 and the second anchor bolts 26 are disposed at inside in the width direction of the flanges 38B. However, the center axial lines of the first fixing holes 18 and the first anchor bolts 24 and the center axial lines of the second fixing holes 20 and the second anchor bolts 26 may be disposed at outside in the width direction of the flanges 38B. In such a configuration, the lower face of the base plate 16 may be formed with the indented portions 22 at the periphery of the second fixing holes 20.

Moreover, in the present exemplary embodiment, at the front side portion and the rear side portion of the base plate 16, positions in the front-rear direction of the center axial lines of the first fixing holes 18 and the first anchor bolts 24 are aligned with the center axial lines of the second fixing holes 20 and the second anchor bolts 26. However, the positions in the front-rear direction of the center axial lines of the first fixing holes 18 and the first anchor bolts 24 may be made different from the position in the front-rear direction of the center axial lines of the second fixing holes 20 and the second anchor bolts 26 at least at one of the front side portion or the rear side portion of the base plate 16.

Moreover, in the first exemplary embodiment to the third exemplary embodiment, the right hand side portion and the left hand side portion of the base plate 16 are respectively provided with a pair of the first fixing holes 18 and the first anchor bolts 24. However, three or more of the first fixing holes 18 and the first anchor bolts 24 may be respectively provided at least at one of the right hand side portion or the left hand side portion of the base plate 16.

Fourth Exemplary Embodiment

Figure 5:
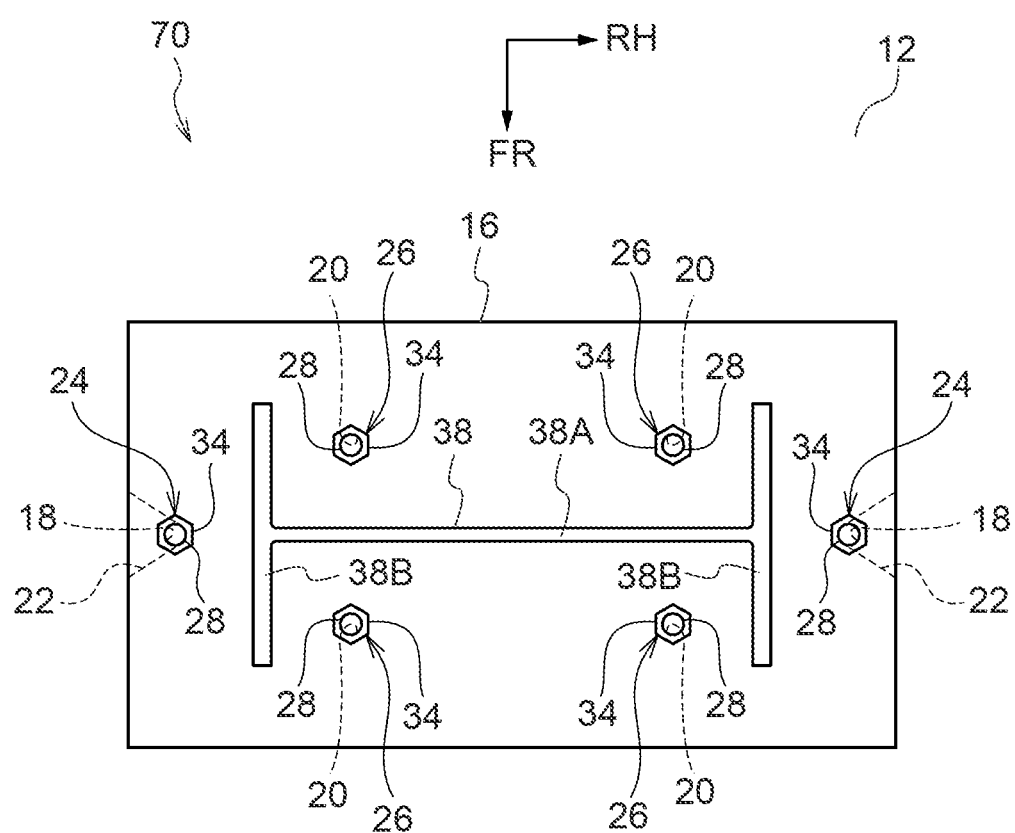
FIG. 5 is a plan view of a column structure according to a fourth exemplary embodiment of the present invention.

FIG. 5 illustrates a plan view of a column structure 70 according to a fourth exemplary embodiment of the present invention.

The column structure 70 according to the present exemplary embodiment is configured substantially the same as the first exemplary embodiment, but differs in the following points.

As illustrated in FIG. 5, in the column structure 70 of the present exemplary embodiment, a single first fixing hole 18 and first anchor bolt 24 are respectively provided at the left hand side portion and the right hand side portion of the base plate 16, and positions in the front-rear direction of the center axial lines of the first fixing holes 18 and the first anchor bolts 24 are aligned with center in the thickness direction (front-rear direction) of the web 38A. Moreover, the center axial lines of the second fixing holes 20 and the second anchor bolts 26 are disposed at inside in the width direction of the flanges 38B.

The lower face of the base plate 16 is not formed with the indented portions 22 at the periphery of each of the second fixing holes 20.

The present exemplary embodiment is capable of exhibiting similar operation and advantageous effects to the first exemplary embodiment, with the exception of operation and advantageous effects resulting from disposing the second anchor bolts 26 (the second fixing holes 20) at outside in the width direction of the flanges 38B.

Note that in the present exemplary embodiment, the center axial lines of the second fixing holes 20 and the second anchor bolts 26 are disposed at the flanges 38B width direction inside. However, the center axial lines of the second fixing holes 20 and the second anchor bolts 26 may be disposed at outside in the width direction the flanges 38B. In such a configuration, the lower face of the base plate 16 may be formed with the indented portions 22 at the periphery of the second fixing holes 20.

Moreover, in the present exemplary embodiment, positions in the front-rear direction of the center axial lines of the first fixing holes 18 and the first anchor bolts 24 are aligned with the center in the thickness direction of the web 38A. However, the front-rear direction positions of the center axial lines of the first fixing holes 18 and the first anchor bolts 24 may be made different to the center in the thickness direction of the web 38A.

Fifth Exemplary Embodiment

Figure 6:
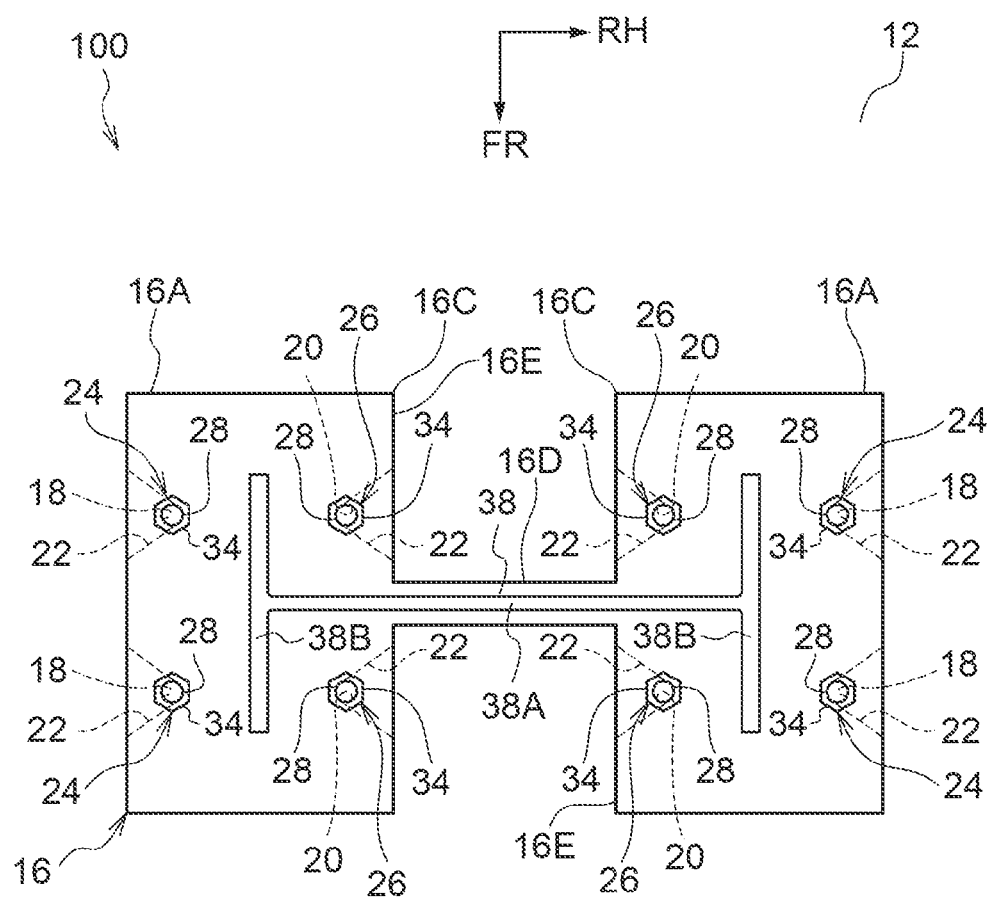
FIG. 6 is a plan view of a column structure according to a fifth exemplary embodiment of the present invention.

FIG. 6 illustrates a plan view of a column structure 100 according to a fifth exemplary embodiment of the present invention The column structure 100 according to the present exemplary embodiment is configured substantially the same as the third exemplary embodiment, but differs in the following points.

As illustrated in FIG. 6, in the column structure 100 of the present exemplary embodiment, rectangular flat plate shaped base portions 16A are respectively provided at the left hand side portion and the right hand side portion of the base plate 16, and a rectangular flat plate shaped connection portion 16D is provided between the pair of base portions 16A. The mortar 14 is disposed across the entire lower side of the pair of base portions 16A and the connection portion 16D. The connection portion 16D is disposed with its length direction parallel to the left-right direction, connecting together the pair of base portions 16A. Cutaway portions 16E that are rectangular shaped in plan view are formed between the pair of base portions 16A at both outsides in the width direction (front-rear direction) of the connection portion 16D. The pair of base portions 16A, the connection portion 16D, and the pair of cutaway portions 16E are disposed symmetrically with respect to a plane that is perpendicular to the left-right direction and passes through in the perpendicular direction at center in the left-right direction of the base plate 16, and also symmetrically with respect to a plane that is perpendicular to the front-rear direction and passes through in the perpendicular direction at center in the front-rear direction of the base plate 16. Portions at center side in the left-right direction of the base portions 16A configure projection portions 16C that are rectangular shaped in plan view.

The lower face of the base plate 16 is formed with the indented portions 22 at the periphery of the respective second fixing holes 20, and the indented portions 22 are configured with a width dimension that gradually increases on progression toward the outer peripheral side of the base portions 16A, with the indented portion 22 open to the outside of the outer periphery of the base portions 16A.

In the steel column 38, the base portions 16A of the base plate 16 are disposed below each of the flanges 38B, and the lower ends of the flanges 38B are welded to the upper faces of the base portions 16A. The base portions 16A are configured with the projection portions 16C at the web 38A sides with respect to the flanges 38B, and the projection portions 16C are disposed below end portions in the width direction of the web 38A. The lower ends of the width direction end portions of the web 38A are welded to the upper face of the projection portions 16C. The connection portion 16D of the base plate 16 is disposed below a center portion in the width direction of the web 38A, and the lower end in the width direction center portion of the web 38A is welded to the upper face of the connection portion 16D. Position in the front-rear direction of center of the connection portion 16D is aligned with position in the front-rear direction of the center in the thickness direction of the web 38A and, for example, the width direction dimension of the connection portion 16D is set at 3 to 5 times the thickness direction (front-rear direction) dimension of the web 38A.

The present exemplary embodiment is capable of exhibiting substantially the same operation and advantageous effects as those of the third exemplary embodiment.

Moreover, in the base plate 16, the base portions 16A are respectively provided at the left hand side portion and the right hand side portion of the base plate 16, and the cut-away portions 16E are provided between the pair of base portions 16A.

This thereby enables the weight of the base plate 16 to be reduced, enabling an improvement in the utilization efficiency (yield) of material for the base plate 16.

Moreover, a drop in the load bearing ability of the portion of the column setup at the lower side of the web 38A is suppressed by the web 38A. The portion of the base plate 16 between the pair of base portions 16A only makes a minor contribution to the load bearing ability of the column setup, thereby enabling the load bearing ability of the column setup to be efficiently exhibited as before, even with the cutaway portions 16E provided between the pair of base portions 16A.

Moreover, the projection portions 16C of the base portions 16A project out further to the web 38A side with respect to the flanges 38B below the web 38A, and lower ends of width direction end portions of the web 38A are welded to the projection portions 16C. Moreover, below the web 38A, the connection portion 16D is connected to the pair of base portions 16A, and the lower end of the web 38A width direction center portion is welded to the connection portion 16D. This thereby enables the steel column 38 to be strongly welded to the base plate 16.

Note that in the present exemplary embodiment, the cutaway portions 16E are rectangular shaped in plan view. However, the cutaway portions 16E may be formed, for example, in triangular shapes in plan view, or in trapezoidal shapes in plan view. In such cases, dimension in the web 38A width direction of the cutaway portions 16E may be made to increase as the cutaway portions 16E progress toward outside in the width direction of the flanges 38B. Moreover, in such cases, the cutaway portions 16E may be provided only on the web 38A side with respect to the flanges 38B, or the cutaway portions 16E may be provided as far as the opposite side to the web 38A with respect to the flanges 38B.

Moreover, in the present exemplary embodiment, the base portions 16A, the connection portion 16D, and the cutaway portions 16E are provided to the base plate 16 of the third exemplary embodiment. However, the base portions 16A, the connection portion 16D, and the cutaway portions 16E may be provided to the base plate 16 of the first exemplary embodiment, the second exemplary embodiment or the fourth exemplary embodiment.

Sixth Exemplary Embodiment

Figure 7:
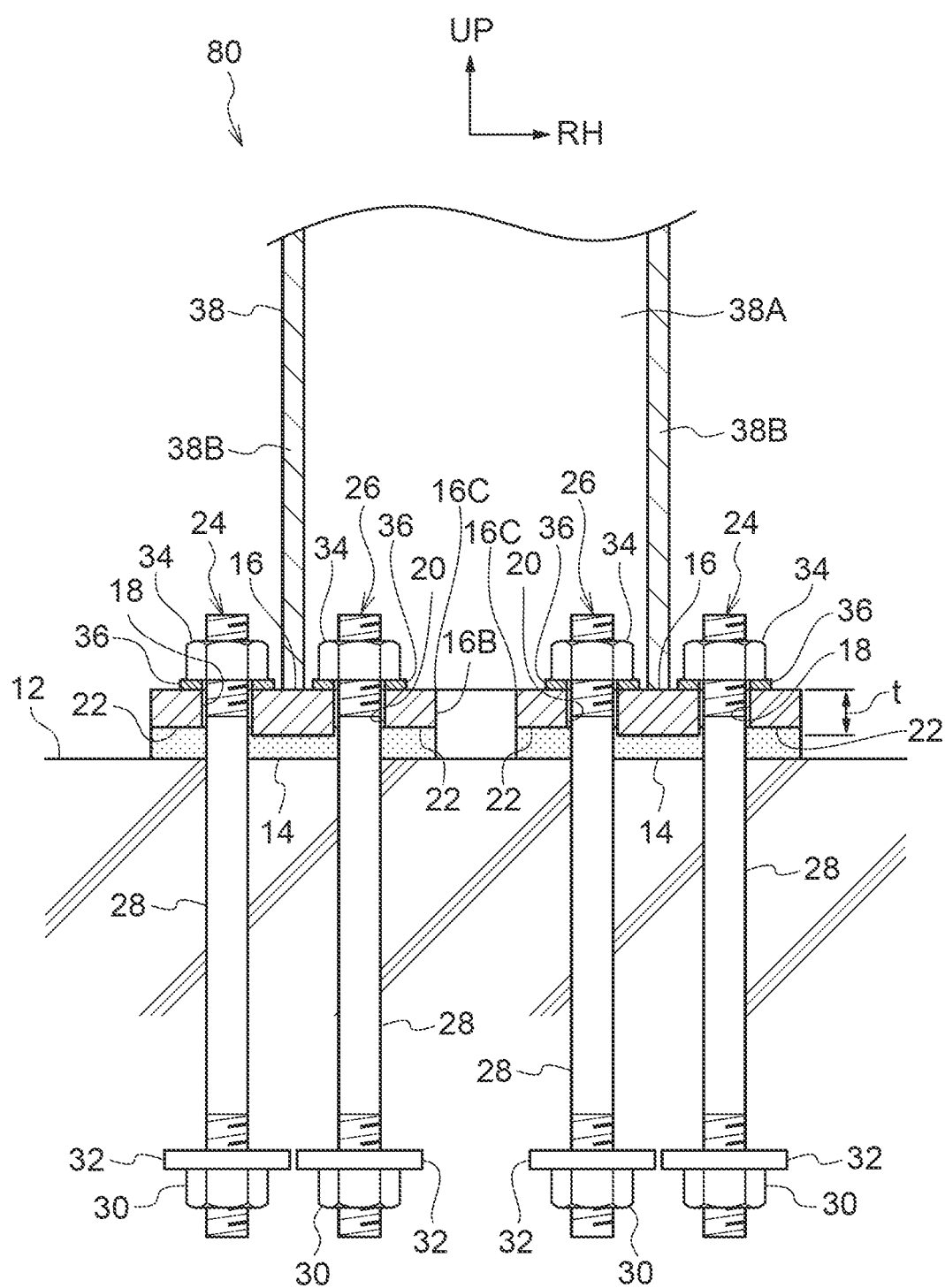
FIG. 7 is cross-section view of a column structure according to a sixth exemplary embodiment of the present invention, as viewed from front side.
Figure 8:
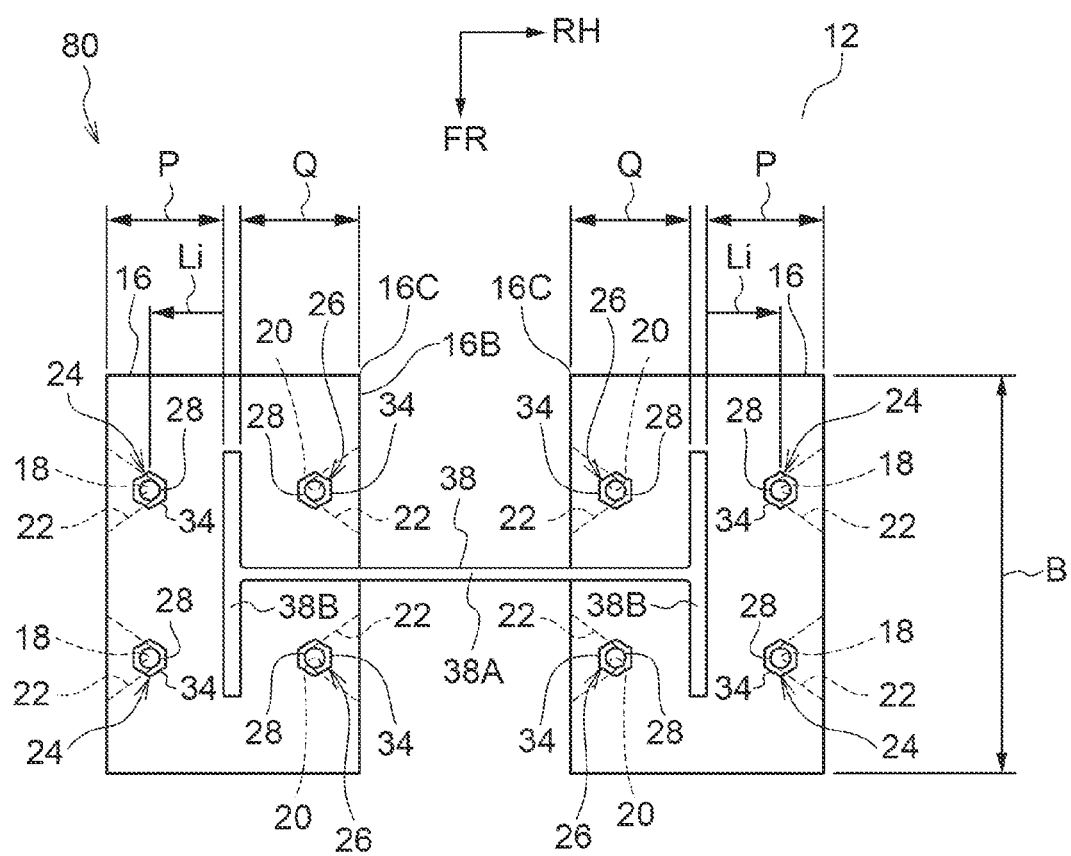
FIG. 8 is a plan view of a column structure according to the sixth exemplary embodiment of the present invention.

FIG. 7 illustrates a column structure 80 according to a sixth exemplary embodiment of the present invention, as viewed in cross-section from the front, and FIG. 8 illustrates a plan view of the column structure 80.

The column structure 80 according to the present exemplary embodiment is configured substantially the same as the third exemplary embodiment, but differs in the following points.

As illustrated in FIG. 7 and FIG. 8, in the column structure 80 according to the present exemplary embodiment, mortar 14 is provided on the left hand side and the right hand side separately, providing a pair of mortar 14 sections that are respectively rectangular shaped in plan view.

Base plates 16 that are respectively rectangular plate shaped in plan view are provided at the left hand side and the right hand side, with a gap 16B of rectangular shape in plan view provided between the pair of base plates 16. The mortar 14 on the left hand side and the right hand side is disposed across the entire lower side of the respective left hand side and right hand side base plates 16. The pair of base plates 16 and the gap 16B are disposed symmetrically to each other about a plane perpendicular to the left-right direction and passing through in the perpendicular direction at center in the left-right direction between the pair of base plates 16, and symmetrically to each other about a plane perpendicular to the front-rear direction and passing through in the perpendicular direction at center in the front-rear direction of the pair of base plates 16. Moreover, rectangular shaped projection portions 16C in plan view are formed at gap 16B side of the base plates 16. Moreover, profile and size in the plan view of the pair of base plates 16 and the gap 16B altogether are similar to the profile and size in the plan view of the base plate 16 in the third exemplary embodiment, and pairs of first fixing holes 18 and pairs of second fixing holes 20 are respectively formed in the left hand side and the right hand side base plates 16 similarly to those formed in the left hand side portion and the right hand side portion of the base plate 16 of the third exemplary embodiment.

Indented portions 22 are also formed to the lower face of the base plates 16 at the periphery of each of the second fixing holes 20. The indented portions 22 are configured with a width dimension that gradually increases on progression toward the outer peripheral side of the base plates 16, with the indented portions 22 open to the outside of the outer periphery of the base portions 16A.

In the steel column 38, the base plates 16 are disposed below each of the flanges 38B, and the lower ends of the flanges 38B are welded to the upper faces of the base plates 16. In the base plates 16, the projection portions 16C are configured at the web 38A sides with respect the flanges 38B, and the projection portions 16C are disposed below the end portions in the width direction of the web 38A, and the lower ends of the width direction end portions of the web 38A are welded to the upper faces of the projection portions 16C. The gap 16B between the pair of base plates 16 is disposed below the center portion in the width direction of the web 38A, and the lower end of the center portion in the width direction of the web 38A is not welded to the base plate 16.

The present exemplary embodiment is capable of exhibiting similar operation and advantageous effects to those of the third exemplary embodiment.

Moreover, the base plates 16 are provided below each of the flanges 38B, and the gap 16B is provided between the pair of base plates 16.

Thus the size in plan view of each of the base plates 16 can be reduced, enabling the total weight of the pair of base plates 16 to be reduced, and enabling an improvement in the utilization efficiency (yield) of material for the pair of base plates 16.

Moreover, due to the web 38A being disposed between the pair of base plates 16, even suppose a single base plate 16 were to be present across the entire lower side of the steel column 38, a drop in the load bearing ability of the lower side portion of the web 38A of the column setup would be suppressed by the web 38A. The portion between the pair of base plates 16 only makes a minor contribution to the load bearing ability of the column setup, thereby enabling the load bearing ability of the column setup to be efficiently exhibited as before, even with the gap 16B provided between the pair of base plates 16.

Moreover, the projection portions 16C of the base plates 16 project out further to the web 38A side with respect to the flanges 38B below the web 38A, and the lower ends of the end portions in the width direction of the web 38A are welded to the projection portions 16C. This thereby enables the steel column 38 to be strongly welded to the base plate 16.

Moreover, if the separation distance in the web 38A width direction between outside edges of the base plates 16 and the flanges 38B is denoted P, and the separation distance in the web 38A width direction between inside edges of the base plates 16 and the flanges 38B is denoted Q, then preferably:

$$P=Q \quad \text{Expression (2)}$$

The above expression is satisfied.

Accordingly, stress can be efficiently transmitted between the first anchor bolts 24 and the second anchor bolts 26, the base plate 16, and the steel column 38.

Moreover, the separation distance in the web 38A width direction between the center axial lines of the second anchor bolts 26 (the second fixing holes 20) and the flanges 38B is the same as or smaller than the separation distance in the web 38A width direction between the center axial lines of the first anchor bolts 24 (the first fixing holes 18) and the flanges 38B. The load bearing ability of the column setup can accordingly be efficiently exhibited in comparison to when the separation distance in the web 38A width direction between the center axial lines of the second anchor bolts 26 (the second fixing holes 20) and the flanges 38B is larger than the separation distance in the web 38A width direction between the center axial lines of the first anchor bolts 24 (the first fixing holes 18) and the flanges 38B.

Seventh Exemplary Embodiment

Figure 9:
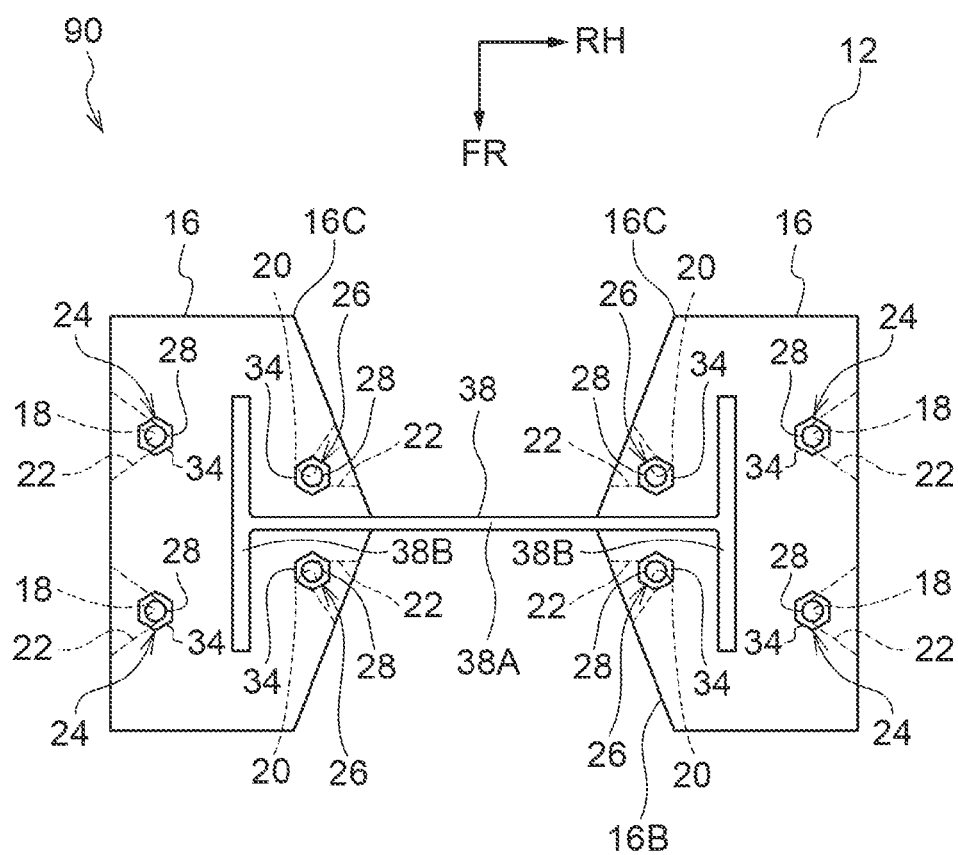
FIG. 9 is a plan view of a column structure according to a seventh exemplary embodiment of the present invention.

FIG. 9 illustrates a plan view of a column structure 90 according to a seventh exemplary embodiment of the present invention.

The column structure 90 of the present exemplary embodiment is configured substantially the same as the sixth exemplary embodiment, but differs in the following points.

As illustrated in FIG. 9, in the column structure 90 according to the present exemplary embodiment, the left hand side and the right hand side base plates 16 are configured such that inside portions in the web 38A width direction (left-right direction) of projection portions 16C are formed isosceles triangular shape in plan view. Inside ends in the web 38A width direction of the base plates 16 (the leading ends of the projection portions 16C) are disposed below the web 38A. Dimension of the inside portions of the projection portions 16C in the flanges 38B width direction (front-rear direction) accordingly gradually decreases on progression toward inside in the web 38A width direction. Dimension in the web 38A width direction of a gap 16B gradually increases on progression toward outside in the flanges 38B width direction.

The center axial lines of the second fixing holes 20 and the second anchor bolts 26 are disposed further inside in the flanges 38B width direction from the center axial lines of the first fixing holes 18 and the first anchor bolts 24.

The present exemplary embodiment is capable of exhibiting similar operation and advantageous effects to those of the sixth exemplary embodiment.

In particular, at the left hand side and the right hand side base plates 16, due to forming the inside portions of the projection portions 16C isosceles triangular shapes in plan view, the projection portions 16C are made smaller and the gap 16B is made larger. This thereby enables the size of each of the base plates 16 to be made even smaller in plan view, and enables the total weight of the pair of base plates 16 to be reduced further, thereby enabling further improvement to the utilization efficiency (yield) of material for the pair of base plates 16.

Moreover, due to disposing the center axial lines of the second fixing holes 20 and the second anchor bolts 26 further toward inside in the flanges 38B width direction from the center axial lines of the first fixing holes 18 and the first anchor bolts 24, each separation distance between adjacent first anchor bolt 24 and second anchor bolt 26 can be made greater in the front-rear direction and the left-right direction. This thereby enables easy layout of major footing beams between the lower end portions of the steel columns 38 of adjacent column structures 90 in a building, enabling efficiency of construction work to be raised.

Moreover, in the present exemplary embodiment, the gap 16B is only provided on the web 38A side of the flanges 38B. However, the gap 16B may be provided extending as far as the opposite side of the flanges 38B to the web 38A.

Moreover, in the present exemplary embodiment, the center axial lines of the second fixing holes 20 and the second anchor bolts 26 are disposed further inside in the flanges 38B width direction from the center axial lines of the first anchor bolts 24 and the first fixing holes 18. Note that, in the sixth exemplary embodiment the center axial lines of the second fixing holes 20 and the second anchor bolts 26 may be disposed inside in the flanges 38B width direction from the center axial lines of the first fixing holes 18 and the first anchor bolts 24. Moreover, in the sixth exemplary embodiment and the seventh exemplary embodiment, the center axial lines of the second fixing holes 20 and the second anchor bolts 26 may be disposed outside in the flanges 38B width direction from the center axial lines of the first fixing holes 18 and the first anchor bolts 24.

Moreover, in the sixth exemplary embodiment and the seventh exemplary embodiment, the center axial lines of the first fixing holes 18 and the first anchor bolts 24 as well as the center axial lines of the second fixing holes 20 and the second anchor bolts 26 are disposed at inside in the width direction of the flanges 38B. However, at least one out of combination of the center axial lines of the first fixing holes 18 and the first anchor bolts 24 as well as combination of the center axial lines of the second fixing holes 20 and the second anchor bolts 26 may be disposed at outside in the width direction of the flanges 38B. In such cases, even when a rotation moment about the lower end of the steel column 38 acts in the flanges 38B width direction (front-rear direction) on the steel column 38, such as during an earthquake, bending deformation of the base plate 16 at outside in the flanges 38B width direction can be suppressed by the first anchor bolts 24 and the second anchor bolts 26, enabling the load bearing ability of the column setup to be even more efficiently exhibited.

Moreover, in the sixth exemplary embodiment and the seventh exemplary embodiment, the pair of base plates 16 are respectively provided with a pair of the first fixing holes 18 and a pair of the first anchor bolts 24. However, one, or three or more, of the first fixing holes 18 and the first anchor bolts 24 may be provided to at least one out of the pair of base plates 16.

Moreover, in the first exemplary embodiment through the seventh exemplary embodiment, there are a pair of second fixing holes 20 and the second anchor bolts 26 respectively provided to both the left hand side portion and the right hand side portion of the base plate 16, or to the pair of base plates 16. However, one, or three or more, of the second fixing holes 20 and the second anchor bolts 26 may be provided to at least one out of the left hand side portion or the right hand side portion of the base plate 16, or to at least one of the pair of base plates 16.

Moreover, in the first exemplary embodiment through the seventh exemplary embodiment, the first anchor bolts 24 and the second anchor bolts 26 are anchored into the same foundation concrete 12. However the first anchor bolts 24 and the second anchor bolts 26 may be anchored to separate blocks of foundation concrete 12.

The invention claimed is:

1. A column structure comprising:
    a column member having a web and flanges that are integrally provided at both sides, in a width direction, of the web;
    a base member having an upper side that is joined to the column member, wherein an indented portion is provided in a lower side face of the base member;
    a first anchor member including a lower end side and an upper end side, wherein a first anchor portion is attached to the lower end side and the lower end side is anchored in concrete, and the base member is fixed to the upper end side of the first anchor member at a position of the base member that is at an opposite side of a flange of the column member from a side of the flange at which the web is located; and
    a second anchor member including a lower end side and an upper end side, wherein a second anchor portion is attached to the lower end side and the lower end side is anchored in concrete, and the base member is fixed to the upper end side at a web side with respect to the flange.

2. The column structure of claim 1, wherein the base member is fixed to the upper end side of at least one of the first anchor member or the second anchor member at an outer side in a width direction of the flange.

3. The column structure of claim 1, wherein the base member comprises:
    base portions that are provided at flange sides;
    a connection portion that connects together a pair of the base portions; and
    a cutaway portion that is provided between the pair of the base portions.

4. The column structure of claim 1, wherein a base member is provided at each flange side of the column member, and a gap is provided between the base members.

5. The column structure of claim 4, wherein a projection portion is provided to the base member and projects out to a web side with respect to the flange below the web.

6. The column structure of claim 1, wherein the base member is disposed at the position of the base member that is at the opposite side of each flange from the side of the flange at which the web is located.

7. A base member that is configured to join to a column member having a web and flanges that are integrally provided at both sides in a width direction of the web, the base member comprising:

a base body that extends on a single plane and that has an upper side for joining to the column member, wherein an indented portion is provided in a lower side face of the base body;

a first fixing portion provided at the base body at an opposite side to the web with respect to a flange of the column member, wherein the first fixing portion is fixed to an upper end side of a first anchor member, the first anchor member includes a lower end side to which a first anchor portion is attached and the lower end side is anchored in concrete; and a second fixing portion provided at the base body at a web side with respect to the flange, wherein the second fixing portion is fixed to an upper end side of a second anchor member, the second anchor member includes a lower end side to which a second anchor portion is attached and the lower end side is anchored in the concrete, wherein a plurality of first fixing portions are disposed at a left hand side portion and a right hand side portion of the base body and a plurality of second fixing portions are disposed at inner side portions from locations where the first fixing portions are disposed.

8. The base member of claim 7, wherein at least one of the first fixing portion or the second fixing portion is disposed at an outer side in a width direction of the flange.

9. The base member of claim 7, wherein the base body comprises:
   base portions that are provided at flange sides;
   a connection portion that connects together a pair of the base portions; and
   a cutaway portion that is provided between the pair of base portions.

10. The base member of claim 7, wherein a base body is provided at each flange side of the column member, and a gap is provided between the base bodies.

11. The base member of claim 10, wherein a projection portion is provided to the base body and projects out to a web side with respect to the flange below the web.

* * * * *